United States Patent [19]
Wong

[11] Patent Number: 5,408,101
[45] Date of Patent: Apr. 18, 1995

[54] LASER ASSISTED QUASI-BLACKBODY RADIATION SOURCE

[75] Inventor: Jacob Y. Wong, Santa Barbara, Calif.

[73] Assignee: Telaire Systems, Inc., Goleta, Calif.

[21] Appl. No.: 909,253

[22] Filed: Jul. 6, 1992

[51] Int. Cl.$^6$ .............................................. G01J 1/00
[52] U.S. Cl. .............................. 250/493.1; 250/504 R
[58] Field of Search ............... 250/493.1, 495.1, 492.1, 250/504 R

[56] References Cited

U.S. PATENT DOCUMENTS

| | | | |
|---|---|---|---|
| 3,316,405 | 4/1967 | Astheimer | 250/493.1 |
| 3,525,033 | 8/1970 | Greenberg et al. | 323/22 |
| 3,878,393 | 4/1975 | Bartlett | 250/504 R |
| 4,599,507 | 7/1986 | Hishikari et al. | 250/493.1 |
| 4,713,742 | 12/1987 | Parsley | 363/124 |
| 4,789,788 | 12/1988 | Cox | 250/493.1 |
| 5,021,659 | 6/1991 | Schneider | 250/336.2 |

OTHER PUBLICATIONS

High Efficiency Telecom Rectifier Using a Novel Soft Switched Boost-Based Input Current Shaper—Robert Streit and Daniel Tollik (Nov. 1991).

*Primary Examiner*—Bruce C. Anderson
*Attorney, Agent, or Firm*—John A. Frazzini

[57] ABSTRACT

A radiation source is presented that exhibits an improved efficiency of converting input energy into a quasi-blackbody output beam. A wavelength selective element can be included to transit one or more narrow bands of this radiation for use in spectroscopy. The intensity of the output beam can be varied quickly, thereby decreasing measurement times and enabling synchronous detection techniques to be implemented at reasonable frequencies. A feedback mechanism can be integrated into this device to enable accurate control of the blackbody temperature. This radiation source can be manufactured by conventional integrated circuit manufacturing techniques, thereby producing an inexpensive quasi-blackbody source of accurately and repeatably controlled performance.

35 Claims, 5 Drawing Sheets

LASER ASSISTED QUASI-BLACKBODY RADIATION SOURCE

FIELD OF THE INVENTION

This invention relates in general to optical sources and relates more particularly to a black body optical source: that is particularly efficient and whose temperature can be rapidly cycled, enabling its spectral distribution and intensity to be rapidly cycled.

CONVENTION REGARDING REFERENCE NUMERALS

In the figures, each element indicated by a reference numeral will be indicated by the same reference numeral in every figure in which that element appears. The first digit of any reference numeral indicates the first figure in which its associated element is presented.

BACKGROUND OF THE INVENTION

In general, chemicals exhibit absorption spectra that uniquely identify each chemical. This enables the concentration of a particular substance (referred to herein as the "test substance") within a sample to be measured by passing a beam of light through the sample and measuring the absorbance of the sample at one or more wavelengths characteristic of that substance. For example, $CO_2$ is fairly unique in having an absorption peak at 4.26 microns, so that light of this wavelength can be used to detect the concentration of $CO_2$.

Because Beer's Law applies in general only to monochromatic or nearly monochromatic light, the absorption by the test substance accurately reflects the concentration of the test substance only if the amount of absorption at each measured peak is separately determined. This can be achieved by use of a monochromatic source, such as a mercury vapor lamp, but this necessitates having available an optical source that produces light only at a wavelength that coincides with an absorption peak of the test substance. A suitable source will not generally be available that has an emission peak substantially coinciding with an absorption peak of the test substance. It is therefore common to utilize a broadband light source in conjunction with some sort of wavelength selective device to direct through the sample only light of the desired wavelength. This can be achieved, for example, by means of specially designed filters (for example, interference filters) that pass only the wavelength of interest. It can also be achieved by means of a diffraction grating that directs different wavelengths of light into different directions. An opaque barrier having an aperture is positioned to pass through the sample only light of the wavelength of interest.

Because of the large number of spectral absorption peaks of organic compounds in the infrared spectral range, it is important to provide optical sources that exhibit a strong intensity in the infrared range. This can be achieved by use of a blackbody radiation source, because such sources can be easily heated to a temperature that provides high intensity light within this wavelength region. Because the blackbody spectral distribution and intensity are uniquely determined by the temperature of the source of this blackbody radiation, the peak intensity can be adjusted by varying the temperature of the blackbody. By Wien's Displacement Law, the peak intensity of a blackbody radiation source of temperature T is at a wavelength $\lambda_{MAX}$ equal to $2.898 \cdot 10^{-3}/T$, where T is measured in degrees Kelvin and $\lambda_{MAX}$ is measured in meters. By proper selection of T and the size of the blackbody radiator, a desired intensity of blackbody light at a selected wavelength $\lambda$ can be achieved.

The spectrum from hot filament approximates blackbody radiation. Because the filament does not have a unit emittance over all wavelengths and because there is some temperature variation within the filament, it is not an ideal blackbody, but its emission spectrum still approximates a true blackbody spectrum over most of its spectral range. Thus, optical sources such as a hot filament lamp, will be referred to herein as a "quasi-blackbody" source. Unfortunately, because such lamps are typically enclosed by a quartz bulb and quartz is substantially opaque for wavelengths longer than about 4.5 microns, the optical spectrum of such optical sources is severely attenuated above 4.5 microns. Because the range of wavelengths for infrared light is from about 1 micron to about 1 mm, a hot filament lamp is not a good source of light for most infrared wavelengths.

Another type of blackbody light source is the Nernst Glower, which consists of a heating element, such as a tungsten filament, embedded in a ceramic block. Because of the large heat capacity of such a device, its peak wavelength and the intensity of its emitted light at a given wavelength cannot be quickly altered. In spectrometry, it is advantageous to be able to change the intensity and/or the wavelength of the optical beam quickly in order to change to a different peak wavelength or to modulate the light intensity. For example, a series of measurements can be performed more quickly if the light can be quickly turned on and off. Also, for the purpose of improving the signal-to-noise ratio, it is useful to be able to modulate the absorption signal, so that it can be separated from the background noise, which does not vary in intensity at this modulation frequency. Thus, it would be advantageous to have a blackbody light source that does not have an artificial cutoff (such as the hot filament lamp) and that enables the intensity and wavelength of the emission peak to be varied much more quickly than the Nernst Glower.

SUMMARY OF THE INVENTION

In accordance with the illustrated preferred embodiments, a quasi-blackbody radiation source is presented that produces a spectral distribution having a peak intensity and wavelength that can be varied much more quickly than for a Nernst Glower. It provides an improved efficiency of coupling power into a quasi-blackbody spectral output. This black body radiation source utilizes an intense beam of light which is directed onto a piece of material that is substantially opaque to this incident heating beam of light. Preferably, this piece of material is a small flake, so that its heat capacity is small, thereby enabling its temperature to be quickly changed by the incident beam of light. A solid state optical source, such as a solid state laser (e.g., neodymium YAG, ruby or titanium laser) or a semiconductor laser (e.g., GaAs, AlGaAs or InGaAsP laser), can be utilized to produce this beam of light. This enables the production of a blackbody source that exhibits the dependability and compactness that is characteristic of much of present-day electronic devices.

This flake can be produced in any convenient manner, but, in one class of embodiments, it is preferred to produce this flake by photolithographic methods commonly used in integrated circuit fabrication. This enables production of flakes having a very high degree of uniformity, so that these devices will exhibit comparable uniformity of operation. Such photolithographic methods also enable production of extremely small flakes, so that the spectral distribution of light emitted by such a source can be quickly varied. In addition, the ability of photolithographic processes to manufacture a large number of flakes from a single wafer greatly reduces the cost of manufacture.

In general, it is advantageous to minimize conductive heat loss from the flake, because this merely diverts input energy away from the quasi-blackbody radiative output which this device is to produce and diverts that portion of the input energy away from heating the flake to a desired operating temperature. This reduced conductive heat loss is achieved by reducing the cross-sectional area that conducts heat from the flake.

Because the energy flux from a blackbody radiator is proportional to its area, in order to achieve the goal of minimizing the heat capacity (which is proportional to the volume of the flake) for a given level of radiated light, it is advantageous to maximize the ratio of the surface area of the flake to its volume. This is achieved by making the flake as thin as possible, subject to requirements of durability. This thin flake should therefore take the form of a thin disk that is supported by a few (preferably 2 or 3) small diameter support struts. Preferably, the length of each strut (i.e., its dimension directed along a direction approximately radially away from the flake) is at least 3 times its maximum lateral dimension to provide therein a reduced temperature gradient that reduces conductive heat loss from the flake.

In one class of embodiments, this flake is a tiny, spherical ball, such as the silicon and germanium balls that are now readily available. Because the ratio of the surface area of a body to its volume is minimal for a sphere, this shape of flake is particularly advantageous in embodiments in which minimization of heat loss is advantageous. Even moreso, this class of embodiments is advantageous because this spherical ball can be held in place by only a small region in contact with a holder and therefore will exhibit a particularly low rate of heat loss. Such balls are also relatively inexpensive, thereby reducing device cost.

Subject to limitations due to the melting temperatures of heated elements, such as the flake and a flake holder, efficiency can be optimized by selecting the temperature of the flake to maximize the fraction of radiated energy that is channeled into the wavelength ranges to be utilized. For a substantially monochromatic source of wavelength span $\alpha\lambda$, this involves maximizing, as a function of temperature, the following function:

$$8\pi hc\Delta\lambda/\lambda^5(\exp\{hc/\lambda kT\}-1)\sigma T^4, \tag{0}$$

Embodiments manufactured by integrated circuit techniques are advantageous for reasons in addition to the ability to produce very small embodiments. This method of manufacture also enables a temperature sensitive device to be manufactured into or adjacent to the flake to provide a temperature signal that can be utilized to regulate accurately the temperature of this flake, thereby accurately regulating the wavelength and intensity of the peak. Once the temperature of the flake reaches a nominal temperature $T_N$, feedback circuitry controls the laser to maintain the temperature of the flake substantially at $T_N$. The ramp-up time to reach $T_N$ can be significantly reduced by selecting the intensity of the incident laser beam such that the flake, could be heated to a temperature much higher than the nominal operating temperature if the temperature sensitive device and associated regulating circuitry did not reduce the intensity of the laser beam.

These manufacturing techniques also enable production of a wide range of flake sizes. Because, for an embodiment in which the temperature of the flake is regulated, the intensity of the emitted light is proportional to the surface area of the flake, this accurate control over flake size enables accurate control of the peak intensity of this device at any given peak wavelength. In an alternate embodiment, the peak temperature is determined only by an equilibrium between the energy input flux from the incident optical beam and the conductive, convective and radiative loss rates.

In another class of embodiments, the peak rate of heat loss is substantially equal to the peak rate of heating, thereby maximizing the frequency at which the temperature of one of these devices can be cycled. For example, in order to reduce the signal-to-noise ratio in a spectrometer, it is advantageous to modulate the intensity of the light incident on the sample, so that synchronous detection techniques can be used to extract this signal from the background noise, thereby greatly improving the signal-to-noise ratio of such systems. The average heat loss can be increased by modulating the temperature by only a fraction (e.g., half or less) of the differential between the peak temperature of the flake and the ambient temperature, whereby, during operation, the flake is always at a significantly elevated temperature that produces a significant rate of cooling. Indeed, if the rate of heat dissipation when the heating beam is off is less than the rate of heating by the beam when the beam is on, then, for a given frequency of modulating the intensity of the heating beam, the flake will exhibit an average temperature that is sufficient to equalize the net heat transfer during the heating and cooling portions of each cycle.

The incident light can be imaged onto the flake by conventional optical elements and can alternatively be directed onto the flake by means of an optical fiber. This latter type of device can include an optical element, such as an ellipsoidal mirror, to image the light diverging from the end of the optical fiber onto the flake. However, in a particularly simple embodiment, the light is directed onto the flake by butting the end of the optical fiber onto the flake. A particularly useful embodiment utilizes a spherical flake that is inserted into a tube of inner diameter substantially equal to that of the spherical flake. The optical fiber has an outer diameter substantially equal to the inner diameter of this tube and is inserted into the tube until it contacts this spherical flake. This spherical flake is then held rigidly in place by the sidewall of the tube, an end of the optical fiber and a plate capping the end of the tube. In this embodiment, the cladding can be stripped from the optical fiber along the portion of the optical fiber that is inserted into this tube. Thus, in this embodiment, the spherical flake can be as small as the diameter of the core of an optical fiber.

To improve the efficiency of radiative transport of the incident light into the spherical flake, the outer surface of the tube into which the spherical flake is inserted is transparent and has an outer surface that is "silvered" (i.e., coated with a reflective coating) to confine the heating beam inside of the this silvered outer surface so that the heating beam can expose the entire surface of the sphere.

In order for the flake to be heated by the incident light, it is necessary that it be of a material that is opaque or substantially opaque to the incident light. Unfortunately, some of these materials will quickly oxidize at the elevated temperatures that the flake will experience during operation of such a device. For example, silicon is an advantageous choice of material, because it is substantially opaque to infrared light and therefore can be used in conjunction with infrared light sources, such as infrared, solid-state lasers, that are readily available and that are inexpensive. Germanium is another material that exhibits these properties. Silicon and germanium are also advantageous choices of material for the flake, because of the great amount of processing technology that is known for silicon and germanium materials, due to their widespread use in integrated circuit technology. Furthermore, silicon has an emissivity value close to unity at or near its melting point (1,420° C.), making it an ideal blackbody radiator at elevated temperatures. Unfortunately, if the silicon flake is allowed to oxidize while elevated to high temperatures, it converts to quartz which is transparent over a wavelength range that may include the wavelength of the optical source used to heat the flake. An element is said to be "transparent" at a preselected wavelength if its absorbance for light of that wavelength is less than $10^{-4}$. Therefore, in this class of embodiments, it is necessary either to include one or more transparent windows to keep the ambient oxygen away from this flake or to utilize an optical source that heats this flake with light to which it is opaque in both its reduced and oxidized states. One choice of window material suitable for use with a silicon flake and a GaAs or AlGaAs laser is zinc sulfide. Although ZnS is particularly advantageous for use in these windows, because of its widespread use in infrared devices, many other infrared transparent materials, such as ZnSe, are known. An advantage of using either of these lasers is that they are widely used in communications and are therefore inexpensive and dependable.

This design is easily scaled by varying the size of the flake and the power of the optical source that illuminates the flake. Because of the relatively low cost of solid-state lasers and the low cost of manufacturing the flake of increased size, the output power of this device can be scaled over a wide range without significantly varying the manufacturing cost.

DESCRIPTION OF THE PREFERRED EMBODIMENTS

Figure 1A:
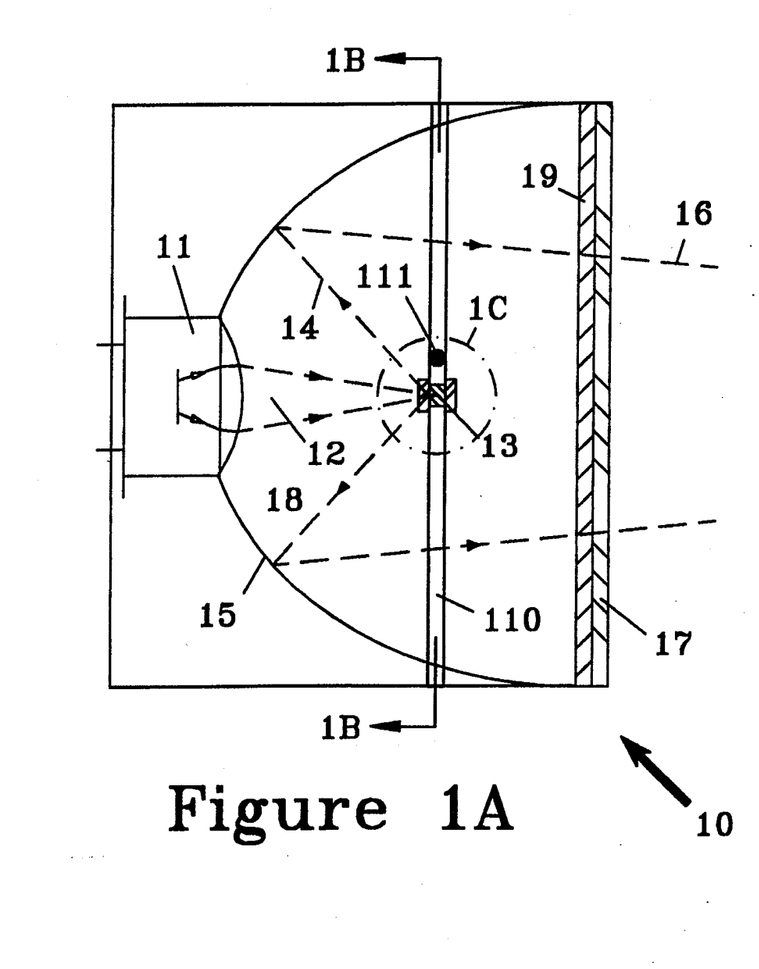
FIGS. 1A and 1B are side and front cross-sectional views of a laser-assisted quasi-blackbody radiation source.
Figure 1B:
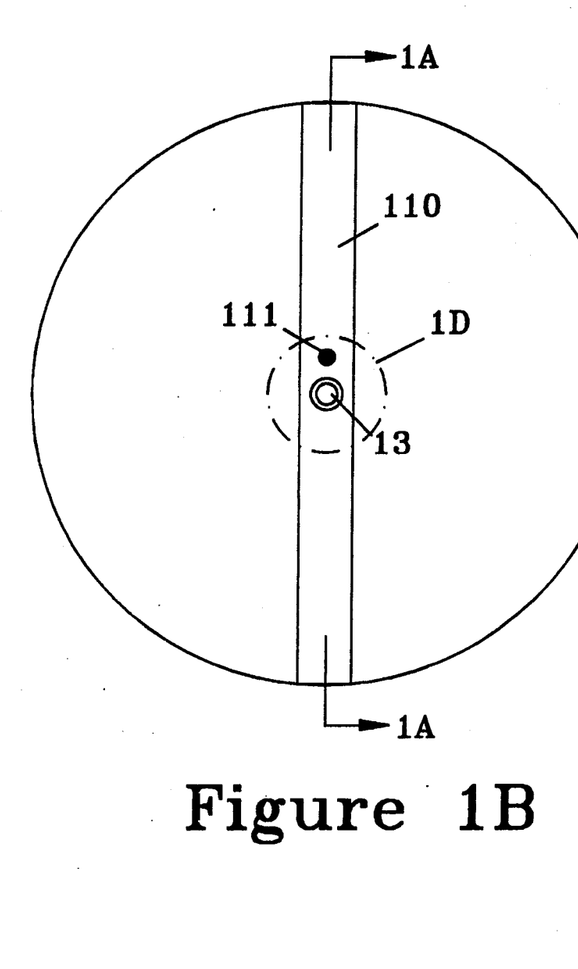

In the laser-assisted quasi-blackbody radiation source 10 illustrated in FIGS. 1A and 1B, an optical source, such as an AlGaAs laser 11, housed in a TO-5 can, directs a heating beam of light 12 onto a flake 13 of material that is substantially opaque to this beam of light. Radiated light 14, having a quasi-blackbody radiation distribution of energy as a function of wavelength, passes through an optical collector 15, such as an ellipsoidal mirror, to produce an output beam of light 16. This heating beam 12 heats flake 13 to a temperature T that produces a desired intensity of radiant energy at one or more selected wavelengths.

A wavelength selective element 17 can be included to transmit only these selected wavelengths of the radiated light. This source can be used in a mono-chromator if only one wavelength is transmitted or can be used in a spectrophotometer if multiple wavelengths are transmitted. There are many examples of suitable wavelength selective elements, including: (i) a filter (such as an interference filter) or (ii) the combination of a dispersive element (such as a diffraction grating or prism) and an opaque plate having one or more apertures placed to transmit only light of the selected wavelength(s).

Because many semiconductor lasers emit the lasing light from the edge of a planar region, such lasing light diverges. Therefore, it is advantageous to include a collimating element, such as collimating lens 18, to direct this lasing light onto the flake. Because the flake is macroscopic, so that only crude imaging is required, collimating lens 18 can be an inexpensive optical element, such as a plastic lens.

The flake is preferably small, so that it has a correspondingly small heat capacity. This small heat capacity enables the temperature of the flake to be changed rapidly. This enables the temperature of the flake to rise quickly to the nominal operating temperature, so that the desired quasi-blackbody spectrum can be quickly established. It also enables the flake to cool quickly, thereby enabling the temperature of this flake to be sinusoidally modulated in order to facilitate the use of synchronous detection at a convenient modulation frequency. The maximum modulation frequency is a function of the heat capacity of the flake and its rate of cooling.

In this embodiment, quasi-blackbody source 10 has a lateral diameter on the order of 2 cm and flake 13 is a rectangular solid of length 0.025 cm, width 0.025 cm and thickness (i.e., the dimension along the direction of the incident heating beam of light 12) 0.0125 cm. Flake 13 is silicon, which has a specific heat of 0.177 cal/g·C.° (which equals 0.74 J/g·C.°) and a density of 2.33 g/cm$^3$. Therefore, the heat capacity of flake 13 is 1.35·10$^{-5}$ J/C.°. For a system utilizing a 20 mW AlGaAs laser, having a 50% loss through the collimating lens 18 and an average combined 50% radiative, convective and conductive heat loss, the average rate of temperature increase of the flake will be on the order of $$5\ mW/1.35 \cdot 10^{-5} J \cdot (C.°)^{-1} = 370\ C.°/s \qquad (1)$$

Under these conditions, the average rate of change in the temperature of the flake when the laser is turned off is on the order of 370 C.°/s so that the temperature ramp-up and ramp-down periods are comparable. The maximum temperature of the flake during use must be less than the melting temperature (1,423° C.) of silicon. This means that the temperature of the flake can be varied between near ambient and a temperature that is somewhat less than this melting temperature on a time scale of several seconds. This temporal variation of the temperature of the flake produces a corresponding temporal variation in the intensity of light emitted by the flake at any given frequency, so that synchronous detection methods can be used in spectrometric applications of this optical source to extract the spectrometric signal from the noise signal.

Figure 1C:
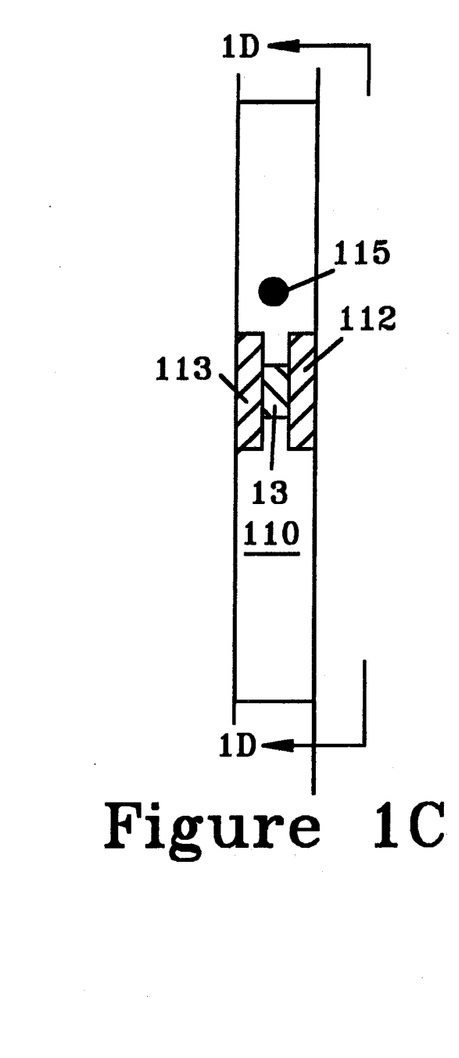
FIGS. 1C and 1D are enlarged views of the central portions of FIGS. 1A and 1B, respectively.
Figure 1D:
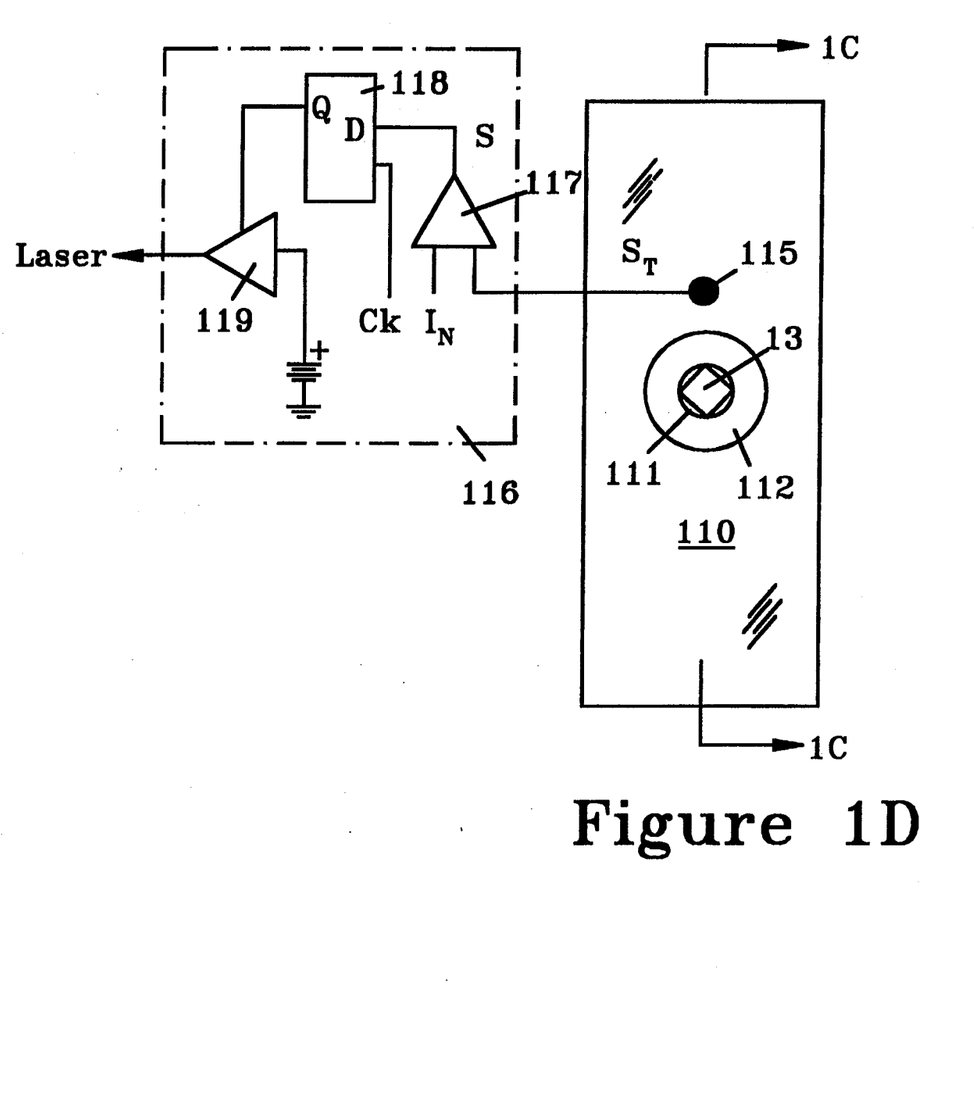

Enlarged views of the central portions of FIGS. 1A and 1B are shown in FIGS. 1C and 1D, respectively. These figures illustrate that flake 13 is contained within a cylindrical cavity 111 that is enclosed by crossbar 110, a first window 112 and a second window 113. Windows 112 and 113 are of a material that is transparent to the light used to expose flake 13 and to the emitted light that is to be utilized. For an embodiment of this quasi-blackbody source to be used as a source of infrared light, suitable materials for the windows 112 and 113 include ZnS and ZnSe.

Figure 2:
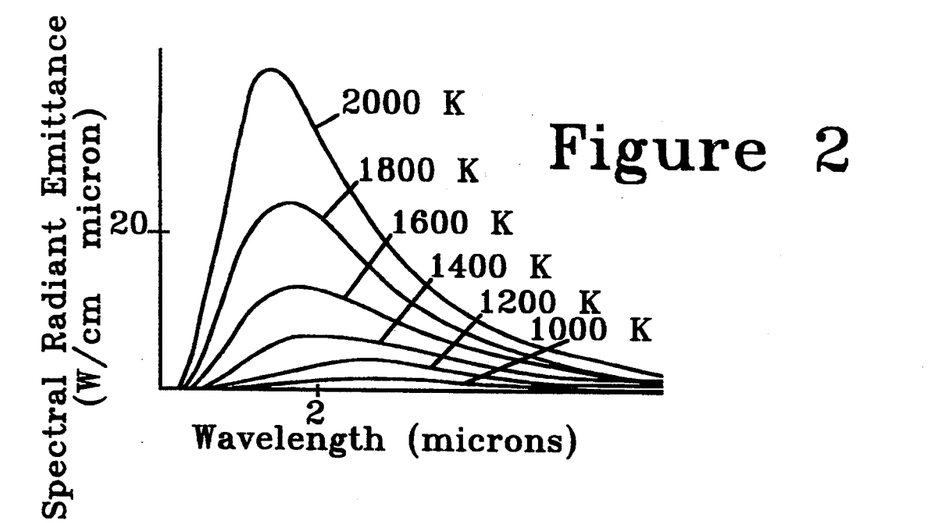
FIG. 2 illustrates the variation of a blackbody spectrum as a function of temperature.

As illustrated in FIG. 2, the wavelength $\lambda_{MAX}$ of the spectral peak and the peak amplitude of a blackbody spectrum both vary as a function of temperature. By Wien's Displacement Law, the peak intensity of a blackbody radiation source of temperature T is at a wavelength $\lambda_{MAX}$ equal to $2.898 \cdot 10^{-3}/T$, where T is measured in degrees Kelvin and $\lambda_{MAX}$ is measured in meters. This figure illustrates that, at each selected wavelength, the intensity decreases monotonically as a function of T. Furthermore, according to Stefan's Law, the total radiated energy is equal to $\epsilon \cdot A \cdot \sigma \cdot T^4$, where $\epsilon$ is the average emissivity, A is the area of the blackbody radiator and $\sigma$ is the Stefan-Boltzmann constant, which is equal to $5.67 \cdot 10^{-8}$ W/m$^2 \cdot °$K$^4$. Therefore, a desired flux of energy at a selected wavelength can be achieved by the proper choice of the area of the blackbody radiator, its temperature and the width $\Delta\lambda$ of wavelength band at such selected wavelength that is transmitted to the test substance. Because the fraction of radiated energy within a wavelength range $\Delta\lambda$ centered at wavelength $\lambda$ is $$8\pi\epsilon hc\Delta\lambda/\lambda^5(\exp\{hc/\lambda kT\} - 1)\sigma T^4, \quad (2)$$

the fraction of energy radiated at the desired wavelength is a strong function of both wavelength and temperature. Thus, both of these parameters strongly affect the efficiency of coupling the energy incident in a beam of light into the selected narrow band(s) of wavelengths to be emitted from this quasi-blackbody source.

A temperature feedback temperature sensitive device 115 (shown in FIGS. 1A–1D) can be included to monitor the temperature of flake 13. Such a temperature sensitive device is preferably directly adjacent to the flake, so that it will accurately measure the flake's temperature. Temperature control circuitry 116 (shown in FIG. 1D) is responsive to an output signal from this temperature sensitive device to control the average intensity of light incident on the flake from laser 10. Such control circuitry is well known. For example, this control circuitry can consist of: a comparator 117 that is responsive to the temperature sensitive device output signal $S_T$ and to an input signal $I_N$, that is indicative of the nominal temperature for the flake, to produce an output signal S that is high whenever $S_T$ is greater than $I_N$. A D-input of a D-type flip-flop 118 is responsive to signal S at each pulse of a clock signal Ck to produce a $\overline{Q}$ output signal that is high if and only if the temperature signal $S_T$ from temperature sensitive device 115 is less than the signal $I_N$ indicative of the nominal temperature for the flake. A buffer 119 is enabled whenever the $\overline{Q}$ output of D-type flip-flop 118 is high, so that the laser is turned on whenever $S_T$ is less than $I_N$ and is turned off whenever $S_T$ is greater than $I_N$.

Figure 3A:
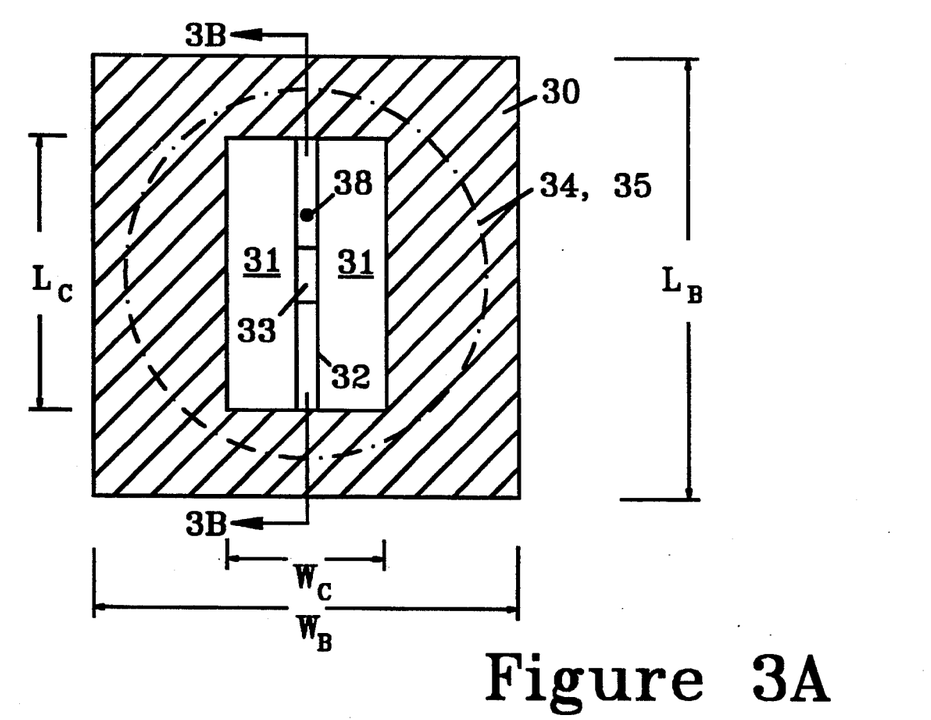
FIGS. 3A and 3B are top and side views, respectively, of a flake that has been fabricated as an intrinsic portion of a flake holder.

In the embodiment of FIGS. 1A and 1B, the top and bottom surfaces of the rectangular flake are in direct contact with the windows and one or more corners of the flake are in contact with the sidewall of the cylindrical cavity 111 in crossbar 110. This can produce an undesirably large amount of heat transport away from the flake. FIGS. 3A (top view) and 3B (side view) illustrate an embodiment that greatly reduces heat transfer from the flake.

Figure 3B:
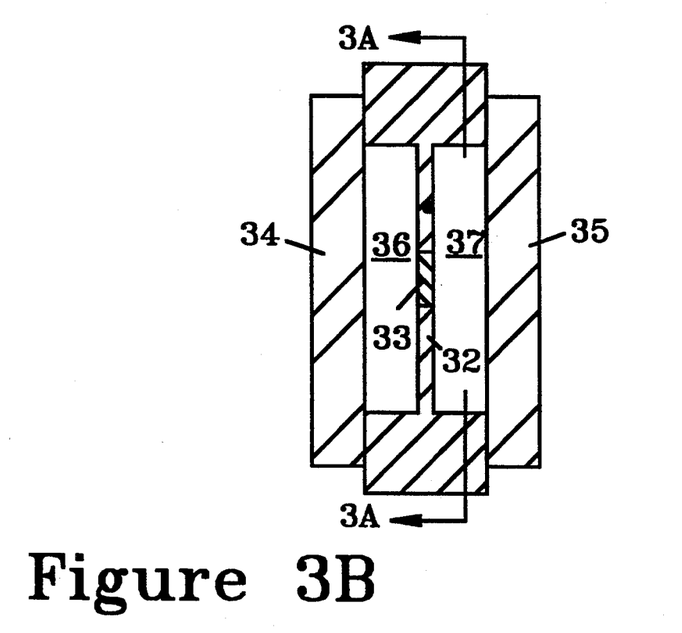

In this embodiment, the flake is an intrinsic part of the flake holder. A block 30, of width $W_B$ and length $L_B$ both equal to 0.236 cm, has formed therethrough an opening 31, of width $W_C$ equal to 0.086 cm and length $L_C$ equal to 0.152 cm, that is spanned by a narrow bridge 32, having a width $W_{Bridge}$ equal to 0.0127 cm, length $L_{Bridge}$ equal to $L_C$, and thickness $T_{Bridge}$ equal to 0.0025 cm. Except for a small portion 33 of this bridge of length $L_F$ equal to 0.0127 cm, this bridge is transparent to light of the wavelengths that are used to expose the flake to elevate its temperature. This small portion 33 functions as the flake in this embodiment. A pair of windows 34 and 35 of diameter large enough to cover openings 31 to seal this flake away from the ambient atmosphere, so that it will not oxidize during operation. Although the amount of air trapped in this cavity is not enough to significantly oxidize flake 33, in an alternate embodiment, this cavity is either evacuated to low pressure (several tens of Torr) or is filled with an inert gas. The windows can be held in place by low temperature epoxy because the low amount of heat transport to the windows does not require the use of high temperature epoxy to hold them in place.

As can be seen in FIG. 3B, this bridge is spaced away from each window by gaps 36 and 37 which, in this embodiment, are both equal to 0.038 cm. This spaces the flake away from both windows and preferably centers it between these windows, so that the heat transfer from the flake to these windows is minimized. Manufactured into the bridge is a diode 38 that functions as a temperature sensitive device that provides information about the temperature of the flake. As discussed above, this enables control over the flux of light onto the flake for precise control of the temperature of the flake.

Figure 4A:
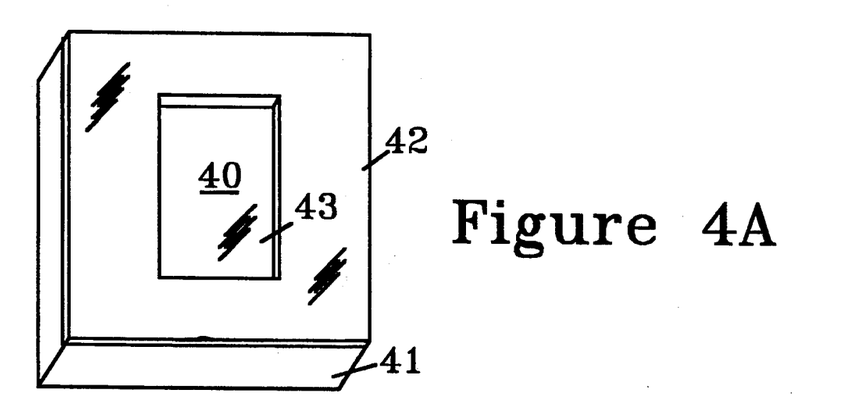
FIGS. 4A–4C illustrate integrated circuit process steps for producing the quasi-blackbody radiation source of FIGS. 3A and 3B.
Figure 4B:
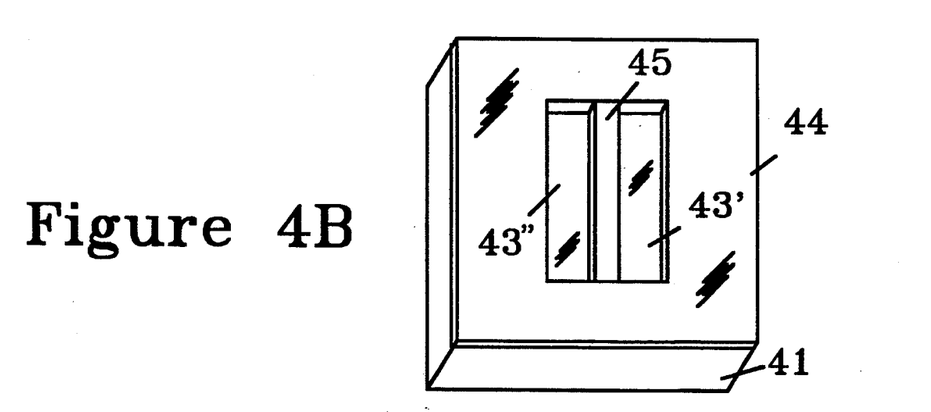
Figure 4C:
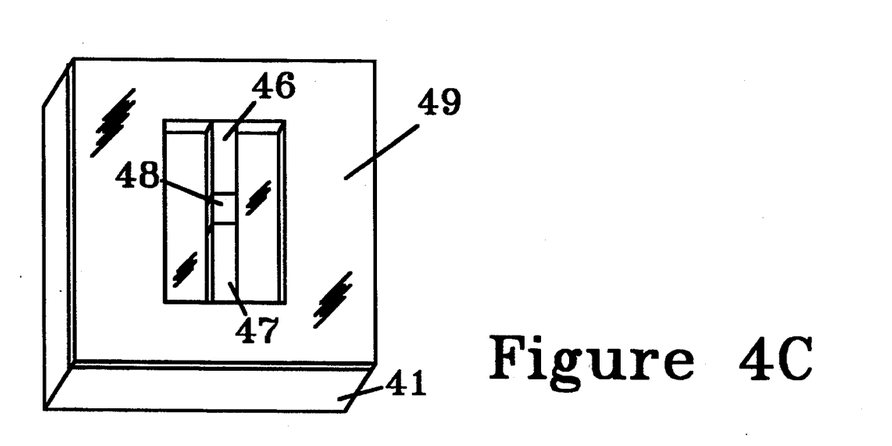

In this embodiment, block 30 and flake 33 are silicon and the bridge (except for portion 33) is silicon dioxide. In an alternate embodiment, the entire bridge is silicon and the flake is defined to be just the portion of the bridge that is illuminated by the beam. This region functions as the flake because it is the only element that is heated significantly by the heating beam. FIGS. 4A–4C illustrate an integrated circuit process of manufacturing the quasi-blackbody source of FIGS. 3A and 3B. FIGS. 4A–4C illustrate just that portion of the top surface of a silicon wafer that corresponds to a single die.

Thinning Steps: A top surface 40 of a wafer 41 is coated with a photoresist layer 42 that is patterned to produce, for each die, an opening 43 that exposes a portion of top surface 40 (Because there are many well-known integrated processes that can used to implement the various photoresist, etch and oxidation steps discussed herein, such details will not be included in this discussion). The exposed portion of surface 40 is etched to reduce the thickness of the wafer in the exposed regions.

The photoresist is removed and these steps are repeated for the opposite surface of the wafer, carefully aligning the wafer so that each of these reduced thickness regions on one side of the wafer is aligned with an associated reduced thickness region in the opposite side of the wafer. As a result of these steps, a cross-section through each of these dies is the same as that shown in FIG. 3B. The depth of etch for each of these two etch steps are preferably equal, so that the bridge will be substantially centered between windows 34 and 35. These depths are also selected to produce the desired 0.0025 cm thickness of the bridge.

Bridge Formation Steps: The wafer is again coated with a photoresist layer which is now patterned to form, for each die, the, pattern illustrated in FIG. 4B—namely, the unetched portions of the wafer are covered by a first portion 44 of this photoresist and each reduced thickness region has a center strip that is covered by a second portion 45 of this photoresist. This produces for each die a pair of openings 43' and 43" through the photoresist, through which the reduced thickness region of the wafer can be further etched. This further etch is continued until a pair of rectangular openings 31 (as seen in FIG. 3A) are formed in each die, thereby producing bridge 32.

The order of the first thinning steps, the second thinning steps and the bridge formation steps is not critical. For example, the bridge can be produced and then can be thinned from both sides. Similarly, the bridge formation step can be performed between the two thinning steps. However, it is advantageous to perform in series those two steps that are carried out from the same side of the wafer so that the wafer need be flipped only once during processing. In another variant of this process, because the wafer is processed from both sides, it can be advantageous to perform two of these etch steps concurrently. For example, the photoresist pattern can be formed on both sides for the thinning steps. The wafer would then be mounted in the etch chamber in a manner that enables both sides of the wafer to be etched and then the etch process can be implemented, thereby etching both sides concurrently. These concurrent etch steps can be either the two thinning steps or can be a thinning step and a bridge formation step.

Flake Formation: The flake is formed by converting the two portions 46 and 47 of the bridge adjacent to the (to-be-formed) flake, 48 into silicon dioxide. This oxidation step can be performed before the bridge formation step, but it is preferred to perform this oxidation step after the bridge formation step, so that, during the bridge formation step, there is no added process complication of having to etch silicon and silicon dioxide regions concurrently.

Although these oxidized portions of the bridge can each extend to its nearest end of the bridge, this is not necessary. The length of these oxidized portions of the bridge need only be long enough that only these two oxidized portions of the bridge and the flake are exposed by the incident radiation for the laser. In particular, it is advantageous to leave at least one section of the bridge (other than the flake) unoxidized. This region can then be processed to produce the temperature sensitive device 38 discussed above. The perimeter 49 of this die can, but need not, also be oxidized.

There are many known methods for oxidizing wafer regions that can be used to form the flake by oxidizing those two sections of the bridge immediately adjacent to each end of the flake. For example, the bridge can be protected with a photoresist in the flake region and then exposed to oxygen at an elevated temperature. Alternatively, ion implant technology can be used to implant oxygen ions only in the sections of the bridge to be oxidized. For example, a shadow mask ion implant technique can be utilized to oxidize portions 46 and 47 without requiring the flake region 48 to be protected by a photoresist layer.

Temperature Sensitive Device Formation: Although the temperature sensitive device can be formed at almost any point in this process, it is most convenient to produce temperature sensitive device 38 after at least one of the thinning steps has been performed, so that oxygen atoms need not be implanted or diffused through an outer portion of the bridge that is subsequently removed. This avoids the need for a deeper diffusion or implant than is required when the temperature sensitive device is formed only after the thinning of the surface through which the diffusion or implant is to take place.

The rate of conductive heat loss is easily calculated for this embodiment. Each section of bridge 32 extending from flake 33 is 0.699 cm long and has a $3.226 \cdot 10^{-5}$ cm$^2$ cross-section. If the temperature is raised by 800 C.° above ambient, the thermal conductivity is 0.0113 cal/-sec·cm·C.°. The combined heat flux through these two sections therefore is $$2 \cdot (0.0113 \text{ cal/sec·cm·C.°}) \cdot (3.226 \cdot 10^{-5} \text{ cm}^2) \cdot (800 \text{ C.°})/(0.699 \text{ cm}) \quad (3)$$

which equals 3.48 mW.

In addition to the conductive heat loss, the radiative and convective heat losses need to be evaluated. In accordance with Stefan's law for a blackbody (i.e., $\epsilon = 1$), the radiative heat loss is $\sigma T^4 \cdot$(area of the radiator) where $\sigma = 5.67 \cdot 10^{-8}$ W/m$^2 \cdot$°K.$^4$. The area of this radiator is approximately $$0.0127 \text{ cm} \cdot 0.0127 \text{ cm} = 3.2 \cdot 10^{-4} \text{ cm}^2 \quad (4)$$

At this temperature (which, in Kelvin, is approximately 1100° K.), in accordance with Stefan's law, the flux of radiated energy is $$(5.67 \cdot 10^{-12} \text{ W/cm}^2 \cdot (K.°)^4) \cdot (3.2 \cdot 10^{-4} \text{ cm}^2) \cdot (1100)^4 = 3.89 \text{ mW}.$$

The rate of convective heat loss can also be simply approximated for this embodiment, using the well-known Langmuir's formula. For a temperature difference of approximately 800° C., the convective heat loss is 93,000·0.1017 Wats/m$^2$ for a flake area of $3.2 \cdot 10^{-4}$ cm$^2$ and the convective heat loss is approximately 0.3 mW. Therefore, the total radiative, convective and conductive power loss is 7.37 mW. Thus, even at this desired peak temperature, a 10 mW AlGaAs laser can provide the needed power, with an excess of about 2.63 mW. If the typical 20% loss on transmission through a lens, such as collimating lens 18 is taken into account, the 10 mW laser diode provides substantially the right amount of heating radiation.

It should also be noted that this example shows how important it is to reduce conductive losses. In particular, it should be noted that much more of the input energy is dissipated as conducted heat than is converted into the desired quasi-blackbody radiant energy.

Figure 5A:
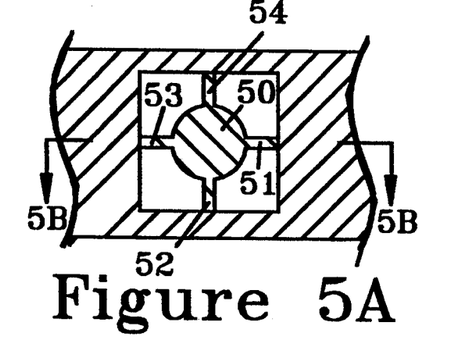
FIGS. 5A and 5B illustrate an embodiment that differs from that in FIG. 4 by an increased area of the flake for the same size of support struts.
Figure 5B:
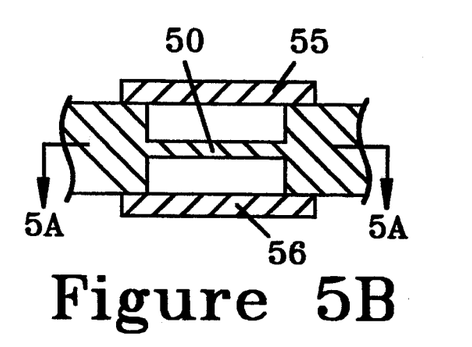

Because the radiated light flux from a quasi-blackbody source is proportional to its surface area and its heat capacity is proportional to its volume, it is advantageous for the source to be as thin as possible so that the radiant energy output could be modulated quickly. This could be achieved by forming the flake as a thin opaque coating on a transparent support structure. Unfortunately, this would produce an undesirably large area for conducting heat away from this flake. Therefore, the improved (i.e., increased) ratio between radiated heat and conducted heat is achieved by the structure illustrated in FIG. 5.

FIG. 5 illustrates an embodiment that differs from that in FIG. 3 by an increased area of the flake for the same size of support struts. The flake 50 now has the shape of a thin disk having a diameter much larger than the diameter of the supporting struts. These struts 51–54 have the same cross-section as bridge 32 in FIG. 3, but the flake 50 now has the shape of a flat disk of the same thickness as the support struts, but a diameter of several times the width $W_S$ of these struts. Even for a flake diameter that is only 4 times the strut width $W_S$, the area of the flake is increased by a factor of approximately 12.

If, as in the previous example, the temperature of this flake is increased to about 800 C.° above ambient, the radiated energy will now be about 25 mW so that almost as much incident energy is coupled into the quasi-blackbody radiation as is wasted as conducted heat. An even greater diameter would produce even more improvement. In other embodiments, the radius can be increased even more and, as needed, the number of support struts can be increased to provide sufficient support for the flake. Such struts should be spaced about the circular perimeter of this flake at substantially equal intervals so that the flux of conductive heat from the flake is not concentrated into a few struts.

Figure 6:
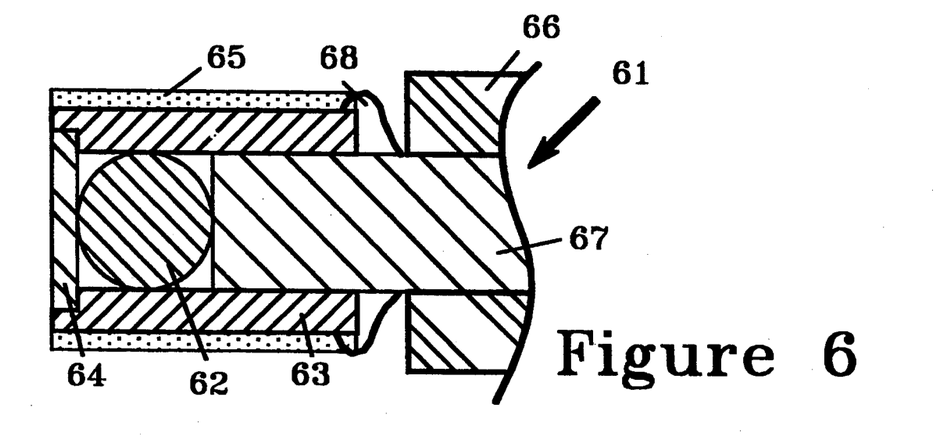
FIG. 6 illustrates a quasi-blackbody radiation source utilizing an optical fiber to illuminate a spherical flake.

FIG. 6 illustrates a particularly simple embodiment that utilizes an optical fiber 61 to transmit light to a flake 62 and that exhibits a particularly low conductive heat loss. This flake is in contact with the exit end of the optical fiber, so that substantially all of the light emitted from the exit end of the optical fiber reaches the flake. Typically, light carried by an optical fiber, such as optical fiber 61, exhibits an approximately 20% coupling loss from the laser into the fiber.

As illustrated in this figure, the flake is easily aligned with the exit end of the optical fiber by utilizing: a spherical flake of diameter equal to that of the optical fiber; and a cylindrical collar 63 of inner diameter equal to the diameters of optical fiber and spherical flake. A window 64 that is transparent to the emission wavelengths of interest is fitted into the end of the cylindrical collar and the fiber is pressed into this collar until the spherical flake is in contact with both the window and the end of the optical fiber. Collar 63 is preferably transparent and coated on an outer surface with a reflective coating 65, such as silver or aluminum, to reflect the heating beam exiting from optical fiber 61 such that the entire surface of spherical flake 62 is irradiated by this heating beam. This improves the efficiency of coupling the heating beam energy into the spherical flake.

As discussed above, it is advantageous for the flake to be as small as possible in order to minimize its heat capacity. Thus, although the end of a cladded fiber could be inserted into the collar, a smaller spherical flake can be utilized if only the core of the fiber is inserted into the collar. This is the case in the embodiment in FIG. 6, in which the cladding 66 has been stripped from the end of the optical fiber, so that only the core 67 is inserted into the cylindrical collar. This embodiment utilizes: a 50 micron diameter spherical silicon flake 62; a pyrex collar 63 of 50 micron inside diameter and 125 micron outside diameter; and an optical fiber 61 having a core 67 of 50 micron outside diameter. An adhesive 68, such as high temperature epoxy, is applied to the end of the collar to bind the collar to the fiber core. The choice of a spherical shape for the flake is advantageous not only for ease and accuracy of alignment of the flake with the optical fiber, but also the minimization of the conductive cooling of the flake by minimizing the area of contact between the flake and elements 63, 64 and 67.

I claim:

1. A source of optical radiation comprising:
   a source of a beam of heating radiation;
   a flake of material upon which this beam is incident; and
   said flake having a volume, surface area and opacity and said beam having an intensity, such that the flake is heated by said beam, within a period on the order of or less than several seconds, to a temperature selected to produce a quasi-blackbody radiation spectrum that has a preselected amplitude A at a preselected wavelength λ.

2. A source of optical radiation as in claim 1 wherein this flake has a volume on the order of or less than $10^{-4}$ cm$^3$.

3. A source of optical radiation as in claim 1 wherein said source of a beam of heating radiation is a solid state source of light.

4. A source of optical radiation as in claim 1, wherein said flake is spherical.

5. A source of optical radiation as in claim 1, further comprising a temperature sensitive device adjacent to said flake to monitor the flake's temperature.

6. A source of optical radiation as in claim 5, further comprising:
   temperature control circuitry, responsive to a temperature output signal from said temperature sensitive device to control the temperature of said flake.

7. A source of optical radiation as in claim 6, wherein said heating beam has an intensity at least 50% greater than needed to achieve a preselected operating temperature, whereby said optical source ramps quickly up to said preselected operating temperature, at which point the temperature regulating circuitry reduces the intensity of the heating beam.

8. A source of optical radiation as in claim 1, wherein said flake has a temperature that is established by the intensity of the heating beam and the geometry of the optical source without any electronic feedback to regulate temperature.

9. A source of optical radiation as in claim 1, further comprising:
   means for modulating the operating temperature of the flake.

10. A source of optical radiation as in claim 9, wherein the peak intensity of the heating beam and the magnitude of thermal conductivity capable of conducting heat away from said flake are selected such that, when the heating beam is alternately switched between an on state of peak intensity and an off state in which the heating beam intensity is zero, a ramp up time during an on state is equal to a ramp down time during an off state, whereby, for a given peak intensity, the modulation frequency of this beam is maximized.

11. A source of optical radiation as in claim 10 further comprising a cooling fin in thermal contact with said flake to enhance a cooling rate of this flake during each off state interval.

12. A source of optical radiation as in claim 1 further comprising:
means for sealing the flake away from ambient atmosphere.

13. A source of optical radiation as in claim 12 wherein said means for sealing comprises at least one window that is substantially transparent to infrared radiation.

14. A source of optical radiation as in claim 13 wherein said flake is spaced away from said window, thereby reducing heat transfer from the flake to the window.

15. A source of optical radiation as in claim 1 wherein said flake has the form of a thin disk having a pair of lateral dimensions that are on the order of or greater than 5 times a thickness of this flake.

16. A source of optical radiation comprising:
a source of a beam of heating radiation;
a flake of material upon which this beam is incident;
said flake having a surface area and opacity and said beam having an intensity, such that the flake is heated by said beam to a temperature selected to produce a quasi-blackbody radiation spectrum that has a preselected amplitude A at a preselected wavelength $\lambda$;
a flake holder having at least 2 struts connected from this holder to said flake to support said flake, whereby conductive heat loss is reduced by providing a low thermal conductivity path through such struts.

17. A source of optical radiation as in claim 16 wherein each strut has a length that is at least three times its maximum lateral dimension, whereby this reduces a temperature gradient in the strut, thereby reducing heat transfer through said strut.

18. A source of optical radiation as in claim 16 wherein said flake holder has only 2 struts which each has a cross-section equal to that of the flake, whereby these two struts and the flake have the form of a single unitary bridge in which a mid portion of this bridge is the flake.

19. A source of optical radiation as in claim 18 wherein said struts are portions of said bridge that have been converted to a chemical state that is substantially transparent to said heating beam.

20. A source of optical radiation as in claim 19 wherein said struts are silicon dioxide and said flake is silicon.

21. A source of optical radiation as in claim 16 wherein said flake has a surface area and opacity and said beam has an intensity, such that the flake is heated by said beam, within a period on the order of or less than several seconds, to a temperature selected to produce a quasi-blackbody radiation spectrum that has a preselected amplitude A at a preselected wavelength $\lambda$.

22. A source of optical radiation comprising:
a source of a beam of heating radiation;
a flake of material upon which this beam is incident;
said flake having a surface area and opacity and said beam having an intensity, such that the flake is heated by said beam to a temperature selected to produce a quasi-blackbody radiation spectrum that has a preselected amplitude A at a preselected wavelength $\lambda$; and
an optical fiber having an input end positioned to receive said beam of heating radiation and having an exit end positioned to direct said beam of heating radiation from this exit end onto said flake.

23. A source of optical radiation as in claim 22 wherein said flake is spherical.

24. A source of optical radiation as in claim 23 further comprising a cylindrical collar having an internal diameter substantially equal to a diameter of said spherical flake.

25. A source of optical radiation as in claim 24 further comprising:
an optical fiber having an input end positioned to receive said beam of heating radiation and having an exit end inserted into said collar to align this exit end with the flake.

26. A source of optical radiation as in claim 25 wherein said optical fiber is inserted into a first end of the collar to a depth such that its exit end is in contact with said spherical flake.

27. A source of optical radiation as in claim 24 further comprising:
a window that is substantially transparent to a preselected range of light to be produced by this source of optical radiation, said window being attached to a second end of said cylindrical collar.

28. A source of optical radiation as in claim 27 wherein said collar, optical fiber and window produce an airtight enclosure around said flake, thereby substantially eliminating oxidation of said flake.

29. A source of optical radiation as in claim 28, wherein said collar has three ribs on an inner surface of the collar, said spherical flake contacting the collar only at said ribs.

30. A source of optical radiation as in claim 29, wherein each rib has a length, in a radial direction of said collar, that is at least three times a width of each rib, whereby this reduces thermal conduction through each rib.

31. A source of optical radiation as in claim 22 further comprising:
a transparent collar encircling said flake and having a first end into which light transmitted through said optical fiber is transmitted onto said flake;
said collar having a reflective coating, whereby a portion of light transmitted through said optical fiber can reflect off of this reflective coating to illuminate portions of the spherical flake that would not otherwise be illuminated.

32. A method of producing quasi-blackbody radiation, said method comprising the steps of:
(i) exposing a flake of material with a heating beam of light of intensity distribution, as a function of wavelength, selected to elevate its temperature to at least 800° C.; and
collecting light radiated from said flake into a beam of output light.

33. A method as in claim 32 further comprising the step of:
(iii) sealing the flake away from ambient atmosphere, thereby avoiding oxidation of this flake during operation.

34. A method as in claim 32 further comprising the step of:
   (iv) modulating the intensity of the heating beam, thereby modulating the intensity of the light radiated from the flake.

35. A method as in claim 32 further comprising the steps of:
   (v) sensing the temperature of the flake; and
   (vi) controlling the intensity of the heating beam in response to the sensed temperature of the flake.

* * * * *